United States Patent Office 3,845,118
Patented Oct. 29, 1974

3,845,118
PROCESS FOR THE PREPARATION OF SORBIC ACID
Hansjorg Hey, Langenhain, Taunus, and Hans-Jurgen Arpe, Fischbach, Taunus, Germany, assignors to Farbwerke Hoechst Aktiengesellschaft vormals Meister Lucius & Bruning, Frankfurt am Main, Germany
No Drawing. Filed Dec. 26, 1972, Ser. No. 318,270
Claims priority, application Germany, Dec. 29, 1971, P 21 65 219.7; July 22, 1972, P 22 36 076.5, P 22 36 143.9; Aug. 25, 1972, P 22 41 836.9
Int. Cl. C07c 51/00
U.S. Cl. 260—526 N     15 Claims

ABSTRACT OF THE DISCLOSURE

A process for the preparation of sorbic acid by catalytic splitting of the polyester formed by reaction of ketene with crotonic aldehyde, thereby using as catalyst a palladium compound in the presence of a tertiary phosphine.

---

The present invention relates to a process for the preparation of sorbic acid.

It is known to obtain sorbic acid from the reaction product of ketene and chrotonic aldehyde according to the following scheme:

$$nH_2C=C=O + nCH_3-CH=CH-\overset{H}{\underset{}{C}}=O \longrightarrow$$

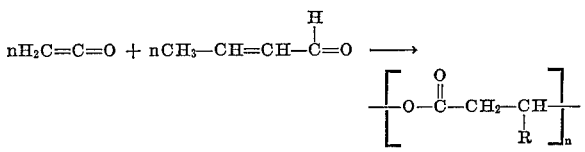

where R is —CH=CH—CH$_3$.

This intermediate product of the preparation process of sorbic acid is generally called "polyester" because of its ester structure. It is formed with different polymerization rates depending on the reaction conditions, i.e., it may contain also oligomers or β-lactone as internal ester.

The known conversion of this polyester to sorbic acid may be carried out by acidic or alkaline hydrolysis. In the case of alkaline hydrolysis, the process has the disadvantage of producing salts, since the sorbic acid has to be isolated from its alkaline or alkaline earth metal salt. This disadvantage is avoided by a thermal splitting with or without addition of basic catalysts, but this process requires high temperatures of from 150° to 300° C. which may cause the formation of by-products or secondary products of sorbic acid, so that the sorbic acid must be separated from these products with great expenditure by distillation purification in the presence of water entrainers and/or in vacuo.

It has now been found that a novel catalyst system for this reaction which is free from the usually employed acids or basic substances splits the polyester in a selective manner under very gentle temperature conditions to obtain sorbic acid.

Subject of the present invention is a process for the preparation of sorbic acid by catalytic splitting of the polyester formed in the reaction of ketene with crotonic aldehyde, which comprises the use as catalyst of a compound or a complex of palladium in the presence of a tertiary phosphine.

The catalyst employed in the process of the invention is composed of a palladium compound and a tertiary phosphine. Both the components of the catalyst individually, i.e. a phosphorus-free palladium compound or a tertiary phosphine alone, practically do not catalyze the splitting of the polyester.

The catalyst used in the process of the invention is formed when a palladium compound and a tertiary phosphine are combined. It is without importance for this formation of the active catalyst whether the palladium compound and the tertiary phosphine are separately added to the reaction mixture or whether the phosphine is already entirely or partially contained in the palladium compound before addition to the reaction mixture. In both cases, a reactive catalyst system is formed directly under the reaction conditions.

For use in the catalyst system, palladium compounds of different chemical structure may be used, for example salts of inorganic and/or organic acids, such as palladium chloride or palladium acetate, or double salts of palladium chloride and alkali metal halides, or also complex palladium compounds such as benzonitrile-palladium chloride, palladium acetylacetonate, bis(pyridine)-palladium chloride, or palladium compounds with polymer organic and inorganic counter-ions, such as for example, ion exchangers or zeolites. As phosphine containing palladium compound, bis(triphenylphosphine)-palladium chloride may for example be used.

As second component of the catalyst system tertiary phosphines of the general formula $PR_1R_2R_3$ are used, where $R_1$, $R_2$, $R_3$ may be aromatic or aliphatic radicals, for example tributylphosphine or triphenylphosphine. Triphenylphosphine is preferred as second catalyst component.

The tertiary phosphines have an additional stabilizing effect on such palladium compounds which may be easily reduced to metallic palladium at elevated temperatures or in the presence of certain organic compounds, for example acetic acid.

It is a characteristic feature of the process of this invention that already very small amounts of the catalyst system cause the splitting of the polyester to form sorbic acid. Therefore, it is not recommended, although not disadvantageous, to use a higher palladium concentration than 1 mole percent (always relative to the sorbic acid formed by complete splitting of the polyester). As the examples show, the activity of the catalyst system is not adversely affected at a concentration of $10^{-3}$ mole percent of palladium compound; and optionally even lower concentrations may suffice.

The molar ratio of palladium compound to tertiary phosphine may widely vary. The minimum atomic ratio of phosphorus to palladium should be to 3:1; this ratio may increase up to very high values, for example 100 to 1000:1.

The speed of the catalytic polyester splitting depends substantially on the ratio of the catalyst components, palladium compound to tertiary phosphine, in the reaction mixture, in that, at the same concentration of palladium compound in the reaction solution, the speed of the splitting increases with increasing concentration of tertiary phosphine; i.e. the yield curve of sorbic acid, obtained by plotting the amount or sorbic acid formed against the time, is flatter in the case of a low concentration of tertiary phosphine.

When the active catalyst is formed in situ, i.e. when the catalyst components, palladium compound and tertiary phosphine, are added to the reaction solution, the sorbic acid can be detected in the reaction mixture only after a certain reaction time, i.e. an induction period. At the same concentration of palladium compound, this induction period increases with decreasing concentration of tertiary phosphine in the reaction solution.

Since this induction period adversely affects also the gross reaction speed of the splitting, a too low concentration of tertiary phosphine in the reaction mixture is disadvantageous for the obtention of a good space-time yield.

It has been observed that the speed of the catalyst splitting of the polyester is especially high when the concentration of tertiary phosphine in the reaction mixture exceeds a certain limit. Advantageous is a concentration of more than 0.1 weight percent, especially preferred is a concentration of more than 0.2 weight percent, relative to the weight of the reaction solution.

In principle, the splitting may be carried out at room temperature, i.e. at a temperature of from 10° to 30° C., and also at lower temperatures, but generally, a temperature above room temperature is chosen. In order to attain a sufficient speed for the obtention of high space-time yields at a very small catalyst concentration, the splitting is advantageously carried out at a temperature of from 80° to 140° C.

It is especially advantageous to operate at a temperature below 120° C. in order to obtain a sorbic acid yield as high as possible. Besides adhering to this reaction temperature limit, it is also favorable for the obtention of high yields to carry out the reaction in such a manner that the sorbic acid concentration in the reaction mixture is as low as possible; i.e. the sorbic acid formed in the splitting reaction is separated from the reaction mixture already before the polyester is completely converted. Preferably, the sorbic acid formed is separated from the reaction solution at a conversion rate of the polyester of below 95% already, and a range of from 30 to 90% of conversion is especially advantageous. The polyester conversion rate may be measured by control of the ester number of the reaction mixture.

The preferred reaction conditions, temperature and conversion rate, are favorable for the obtention of maximum sorbic acid yields for the following reasons: In addition to the direct splitting of the polyester into sorbic acid, a substantial secondary reaction affecting the sorbic acid yield occurs. With increasing temperature, the sorbic acid is subjected to a catalytic secondary reaction resulting in a decarboxylation with formation of pentadiene-(1,3), i.e. piperylene. This sorbic acid consuming reaction superimposes the sorbic formation reaction and causes a decrease of sorbic acid yield. The yield curve, obtained by plotting the sorbic acid yield against the time, proves this phenomenon very clearly. Moreover, in the course of the polyester splitting, also the sorbic acid which is concentrating in the reaction mixture is subjected to a decarboxylation; i.e. depending on the reaction time the sorbic acid yield passes through a maximum. Of course at higher reaction temperature this maximum is more rapidly attained, but when the splitting is carried out at temperatures above the preferred range indicated for the process of this invention, lower absolute yield values are obtained than those obtainable in accordance with this preferred range. This is due to the fact that with increasing temperature the decarboxylation speed increases at a still greater rate than the speed of polyester splitting. The amount of sorbic acid which can be destroyed by decarboxylation in the reaction mixture can be reduced to a great extent by separating the sorbic acid formed before attaining the maximum yield, which may be done by cooling and separating the crystallizing sorbic acid. The sorbic acid may also be isolated by other methods, for example addition of solvents. Subsequently, the non-converted polyester may be further split by renewed heating, and this operation may be repeated until the polyester is completely converted.

Especially when the polyester splitting is carried out continuously, the incomplete conversion of the polyester in accordance with this invention favorably affects the obtainable sorbic acid yield. This method, with continuous recirculation of the mother liquor remaining catalytically active, ensures a practically quantitative sorbic acid yield.

In the process of the invention, the polyester may be used undiluted or diluted, which latter form is advantageous in the case of products having a higher polymerization degree. The polyester may be employed as crude product, i.e. as it is obtained in the reaction of ketene with crotonic aldehyde. Residues of the catalyst used for the preparation of the polyester have no adverse effect. Usual inert solvents, for example aliphatic or aromatic hydrocarbons, such as hexane, cyclohexane, benzene, toluene, xylene or the derivatives thereof may be employed, or carboxylic acids, such as acetic or propionic acid, or solvents containing oxygen or nitrogen, such as methylethylketone, butyl alcohol, dioxan, butyl acetate or dimethyl formamide. Mixtures of these solvents may also be used. Of course, those solvents which undesirably react with the catalyst system or the reaction product, for example those reducing the palladium compound, such as formic acid, and those forming undesired complexes with palladium, for example allyl acetate, should not be chosen. Inappropriate are also halogen containing solvents, since they react with the phosphine. Basic solvents also would disturb the course of the process of the invention when they form salts with the sorbic acid and thus complicate the work-up thereof.

It is especially advantageous to use those solvents, for example aromatic hydrocarbons, which easily dissolve the polyester, possible impurities and the catalyst, but which relatively scarcely dissolve the sorbic acid.

The amount of sorbic acid which can be destroyed by decarboxylation can be furthermore reduced by choosing an appropriate solvent or combination of solvents. For example, when the polyester splitting is carried out in acetic acid or a toluene/acetic acid mixture, the amount of sorbic acid lost by decarboxylation, at the same conversion rate of polyester, is inferior to that lost in the case of using pure toluene. Therefore, a mixture of acetic acid and toluene is the preferred solvent, and especially good results are obtained when from 10 to 40 weight percent of acetic acid are employed.

The reaction is advantageously carried out under normal pressure; but optionally, depending on the boiling point of the solvent used, it is also possible to operate under elevated or low pressure.

In an operation mode advantageous for the course of the reaction, the components of the catalyst and the polyester, optionally with addition of solvents, are introduced in the homogenous phase into a glass flask, an autoclave or a similar apparatus suitable for liquid phase reactions, and then reacted.

In the case where one of the two components of the catalyst is part of a high molecular weight or polymer structure, for example when palladium ions are fixed to an ion exchanger or a zeolite, the usual methods for such catalyst systems, for example operation in the sump or trickling phase, may be employed.

The crude acid having a light yellow color and the form of crystals which is obtained with high yield in the splitting reaction on account of the gentle preparation is distinguished by a low content of impurities of a kind easily removable by usual gentle purification processes. Already by recrystallization alone, this crude acid is converted to pure, colorless sorbic acid. Of course, also other usual purification methods may be employed.

Besides the desired trans-trans-hexadienoic acid-(2,4), i.e. sorbic acid, practically no further isomeric hexadienoic acids are obtained.

For economy reasons, the mother liquor, in which the active catalyst system is still dissolved also after separation of the sorbic acid when the reaction is carried out in the homogenous phase, can be reused for the splitting of further polyester.

As compared to hitherto known processes for the preparation of sorbic acid from the polyester, the process of the invention presents a series of surprising advantages: Already at low temperatures the conversion to sorbic acid with high yields is possible. Besides sorbic acid, practically no isomeric 2,4-hexadienoic acids are obtained. The crude acid is directly obtained in the form of crystals and therefore can be easily separately; its further purification to obtain colorless sorbic acid can be carried out by simple recrystallization.

It is especially advantageous to operate with exclusion of atmospheric oxygen, which is preferably realized by carrying out the reaction in a nearly completely filled and hermetically closed vessel or in an apparatus under protective gas, for example under nitrogen, argon or $CO_2$. The slight overpressure sometimes employed when operating under inert gas does not adversely affect the reaction.

It is advantageous to exclude atmospheric oxygen from all single process steps, i.e. from the catalytic splitting of the polyester and from the possible recovery of the mother liquor containing the catalyst for reuse. This measure maintains the complete activity of the catalyst also when it is reused for the polyester splitting, and thus increases the profitability of the process.

The following examples illustrate the invention. In Examples 1 to 10, a crude polyester made from ketene and crotonic aldehyde was used, the amount of pure polyester of which (convertible to pure sorbic acid according to known methods) having been 63%.

Example 1

5 mg. of palladium chloride and 1.6 g. of triphenylphosphine were added to a solution of 200 g. of polyester in 185 g. of toluene in a glass flask. The clear reaction solution was heated for 8 hours at 108° C. On cooling, 141 g. of light yellow crude acid precipitated, from which 125 g. of colorless sorbic acid having a melting point of 133–134° C. were obtained by recrystallization.

Example 2

500 mg. of palladium acetate and 1.75 g. of triphenylphosphine were added to a solution of 50 g. of polyester, 100 g. of toluene and 27 g. of acetic acid in a glass flask. After the reaction solution had been abandoned for 98 hours at about 20° C., the sorbic acid began to precipitate in the form of light yellow crystals. After a further reaction time of 40 hours at this temperature, 29 g. of crude sorbic acid were separated from the mother liquor by suction-filtration.

Example 3

50 mg. of palladium acetate and 580 mg. of triphenylphosphine were added to a solution of 50 g. of polyester in 27 g. of acetic acid in a glass flask. The solution was heated for 4 hours to 95° C. On cooling, 35 g. of sorbic acid precipitated from the mother liquor.

Example 4

100 mg. of palladium acetate and 350 mg. of triphenyl phosphine were added to a mixture of 50 g. of polyester and 50 g. of methylethylketone in a glass flask. The solution was heated for 4 hours to 80–90° C. On cooling, 31.2 g. of sorbic acid precipitated from the mother liquor.

Example 5

5 mg. of palladium acetate and 464 mg. of triphenylphosphine were added to a mixture of 100 g. of polyester and 75 g. of p-xylene in a glass flask. The solution was heated to 130–135° C. for 40 minutes. On cooling, 54.1 g. of sorbic acid precipitated from the mother liquor.

Example 6

8.1 mg. of bis-aniline-palladium chloride and 232 mg. of triphenylphosphine were added to a solution of 50 g. of polyester in 50 g. of toluene in a glass flask. The solution was heated to 108° C. for 2½ hours. On cooling, 30.6 g. of sorbic acid precipitated from the mother liquor.

Example 7

8.5 mg. of benzonitrile-palladium chloride and 232 mg. of triphenylphosphine were added to a solution of 50 g. of polyester in 50 g. of toluene in a glass flask. The solution was heated to 108° C. for 2½ hours. On cooling, 29.6 g. of sorbic acid precipitated from the mother liquor.

Example 8

71.2 g. of bis(triphenylphosphine)-palladium chloride and 29.2 mg. of triphenylphosphine were added to a solution of 25 g. of polyester and 25 g. of toluene in a glass flask. The solution was heated to 108° C. for 2½ hours. On cooling, 9.8 g. of sorbic acid precipitated from the mother liquor.

Example 9

5 mg. of palladium acetate and 2.5 g. of triphenylphosphine were added to a solution of 500 g. of polyester in 500 g. of toluene in a glass flask. The solution was heated to 108° C. for 10 hours. On cooling, 230 g. of sorbic acid precipitated from the mother liquor.

Example 10

100 g. of polyester were heated to 100–110° C. in a glass flask, and 0.1 g. of palladium acetate and 1.16 g. of triphenyphosphine were added. The mixture was reacted for 4 hours with agitation, subsequently cooled, and the crude sorbic acid which had precipitated in the form of crystals was separated from the mother liquor by suction-filtration. After washing with a small amount of toleune, 68 g. of sorbic acid were obtained.

Example 11

In a reaction flask under argon atmosphere, a solution of 400 g. of polyester having an ester content of 90% (ascertained by determination of the ester number) and 350 g. of toluene were heated to 100° C. and subsequently 40 mg. of palladium acetate (0.175 millimole) and 0.8 g. (3 millimoles) of triphenylphosphine in 30 g. of toluene were added. The atomic ratio of phosphorus to palladium in the reaction solution was 17:1.

After different reaction periods, samples of 50 ml., corresponding to 21.5 g. of polyester, were taken. On cooling to 15° C., different amounts of light yellow sorbic acid precipitated, which were separated from the samples under the same conditions. Tthe crude sorbic acid, according to titration, had a content of 98% of pure substance.

The crystallized amounts of 98% sorbic acid are listed in the following Table in their dependence on the reaction time:

| Reaction time (hours) | 1 | 2 | 4 | 6 |
|---|---|---|---|---|
| Sorbic acid (g.) | 0 | 2.5 | 10 | 14 |

Examples 12 to 16

The procedure was as described in Example 11, but different amounts of triphenylphosphine were added to the polymer solution. The amounts of crystallized sorbic acid in their dependence on the triphenylphosphine concentration and the reaction time are listed in the following Tables:

Example 12—1.2 g. triphenylphosphine

| Reaction time (hours) | 1 | 2 | 4 | 5 |
|---|---|---|---|---|
| Sorbic acid (g.) | 0 | 7.5 | 14.8 | 15.0 |

Example 13—1.6 g. triphenylphosphine

| Reaction time (hours) | 1 | 2 | 4 | 5 |
|---|---|---|---|---|
| Sorbic acid (g.) |  | 11.8 | 14.9 | 15.0 |

Example 14—2 g. triphenylphosphine

| Reaction time (hours) | 0.5 | 1 | 2 |
|---|---|---|---|
| Sorbic acid (g.) | 0 | 7.2 | 14.4 |

Example 15—2.8 g. triphenylphosphine

| Reaction time (hours) | 0.5 | 1 | 2 |
|---|---|---|---|
| Sorbic acid (g.) | 0 | 10.6 | 14.8 |

Example 16—4 g. triphenylphosphine

| Reaction time (hours) | 0.5 | 1 | 2 |
|---|---|---|---|
| Sorbic acid (g.) | 2.5 | 13.5 | 15.3 |

Example 17

In a glass flask under an argon atmosphere, a solution of 400 g. of polyester of ketene and crotonic aldehyde having an ester content of 90% (ascertained by titration) were heated in 345 g. of p-xylene to 120° C., and subsequently the catalyst, 120 mg. of palladium acetate and 1.85 g. of triphenylphosphphosphine in 34 g. of p-xylene, was added.

After three different reaction times of 10, 35 and 90 minutes, samples of 50 ml., corresponding to 21.5 g. of polyester, were taken. On cooling to 15° C., different amounts of light yellow sorbic acid were obtained which were separated from the mother liquor of the three samples under the same conditions.

The amounts of sorbic acid in dependence on the reaction time are listed in the following Table

| Reaction time (minutes) | 10 | 35 | 90 |
|---|---|---|---|
| Sorbic acid (g.) | 5.6 | 13.2 | 12.0 |

Examples 18 to 21

As in Example 17, 400 g. each of 90% polyester in 345 g. of p-xylene were heated to 110° C., 100° C., 90° C. and 80° C. After addition of the catalyst, i.e. 120 mg. of palladium acetate and 1.85 g. of triphenylphosphine in 34 g. of p-xylene, samples of 50 ml. each (this volume contained 21 g. of polyester before the reaction) were taken from the four batches after different reaction times. The amounts of sorbic acid crystallized on cooling of the samples to 15° C. and isolated under the same conditions in each case are listed in the following Tables in their dependence on the reaction temperature and time:

Example 18—Reaction temperature, 110° C.

| Reaction time (minutes) | 30 | 60 | 100 | 180 |
|---|---|---|---|---|
| Sorbic acid (g.) | 7.2 | 13.2 | 13.7 | 13.0 |

Example 19—Reaction temperature, 100° C.

| Reaction time, (hours) | 1 | 2 | 4 | 6 |
|---|---|---|---|---|
| Sorbic acid (g.) | 12.7 | 14.7 | 14.0 | 13.4 |

Example 20—Reaction temperature, 90° C.

| Reaction time (hours) | 1 | 2 | 3 | 4 | 9 |
|---|---|---|---|---|---|
| Sorbic acid (g.) | 1.3 | 14.0 | 15.1 | 14.9 | 14.5 |

Example 21—Reaction temperature, 80° C.

| Reaction time (hours) | 2 | 3 | 4 | 7 | 15 |
|---|---|---|---|---|---|
| Sorbic acid (g.) | 1.0 | 10.0 | 14.0 | 15.0 | 14.9 |

Example 22

At a reaction temperature of 100° C., 50 mg. of palladium acetate and 2.5 g. of triphenylphosphine were added to a solution of 460 g. of polyester having an ester content of 90% (ascertained by determination of the ester number) and 620 g. of toluene in a glass flask under argon atmosphere.

After different reaction times, the sorbic acid crystallizing in each case on cooling to 20° C. was separated by means of a nitrogen frit, and the splitting reaction was continued by renewed heating of the reaction solution to 100° C.

The different amounts of sorbic acid having a content of 98% according to titration, which amounts were obtained from this batch after different reaction times, are listed in the following Table:

| Reaction time (hours) | 0–1 | 1–1.5 | 1.5–2.5 | 2.5–5 |
|---|---|---|---|---|
| Conversion rate in percent* | 39 | 70 | 34 | 30 |
| Sorbic acid (g.) | 105 | 126 | 59 | 36 |

*The conversion rate of splittable polyester was calculated in each case on the ester numbers before and after each reaction step.

After a further three hour reaction under the same conditions and after work-up of the mother liquor, again 85 g. of sorbic acid could be isolated. In this test, therefore, a total of 411 g. of 98% sorbic acid was obtained, which corresponds to a pure acid yield of 97%.

Examples 23 and 24

In Example 23, pure toluene, and in Example 24, a mixture of toluene and acetic acid, containing 20 weight percent of acetic acid, were used as solvents.

100 g. each of 90% polyester in 100 g. of solvent were heated to 100° C. After addition of the catalyst, i.e. 10 mg. of palladium acetate and 500 mg. of triphenylphosphine, the $CO_2$ formed by decarboxylation in the course of the splitting reaction was collected. Both tests were stopped after 90 minutes.

The conversion rates of polyester and the $CO_2$ volumes formed in the course of the reaction are listed in the following Table:

| Example | Composition (percent) | | Conversion (percent) | $CO_2$ (ml.) |
|---|---|---|---|---|
| | Toluene | Acetic acid | | |
| 23 | 100 | 0 | 72 | 719 |
| 24 | 80 | 20 | 78 | 225 |

Example 25 (Comparative Example)

In an open glass flask having a capacity of 2 liters, a solution of 400 g. of polyester having an ester of 90% (ascertained by determination of the ester number) and 400 g. of toluene were agitated at 100° C. The catalyst, i.e. 0.4 g. of palladium acetate and 1.85 g. of triphenylphosphine in 30 g. of toluene, was added. After a reaction time of 4 hours, on cooling to 15° C., 96 g. of a 98% sorbic acid were obtained.

Example 26

The procedure was as in Example 25, but the reaction flask was closed so that no air from the outside could enter the flask any more. After a 4 hour reaction, 183 g. of sorbic acid were obtained from the solution cooled to 15° C.

Example 27

The procedure was as in Example 25, but the reaction was carried out under the protective atmosphere of $CO_2$. After a 4 hour reaction at 100° C. and on subsequent cooling to 15° C., 285 g. of 98% sorbic acid were obtained.

What is claimed is:

1. A process for the preparation of sorbic acid by catalytic cleavage of a polyester in solution in an enert solvent or in the absence of a solvent, said polyester being formed by a reaction of ketene with crotonic aldehyde which comprises cleaving at a temperature from 10° to 140° C., said ester in the presence of a catalyst, wherein as catalyst a compound of palladium is used in the presence of a tertiary phosphine of the formula $PR_1R_2R_3$ wherein $R_1$, $R_2$, or $R_3$ is an aromatic or aliphatic hydrocarbon moiety, at an atomic ratio of phosphorus to palladium of at least 2 to 1 with the tertiary phosphine being of a concentration of more than 0.1 percent by weight of the reaction solution.

2. A process as claimed in Claim 1, wherein a compound of bivalent palladium is used.

3. A process as claimed in Claim 1, wherein triphenylphosphine is used as the tertiary phosphine.

4. A process as claimed in Claim 1, wherein the catalyst is admixed with a solution of the polyester in hexane, cyclohexane, benzene, toluene, xylene, acetic acid, propionic acid, methyl ethyl ketone, butyl alcohol, dioxane, butyl acetate, or dimethyl formamide.

5. A process as claimed in Claim 1, wherein the concentration of tertiary phosphine in the reaction mixture is in excess of 0.1 weight percent, relative to the weight of the reaction solution.

6. A process as claimed in Claim 1, wherein the concentration of tertiary phosphine in the reaction mixture is in excess of 0.2 weight percent, relative to the weight of the reaction solution.

7. A process as claimed in Claim 1, wherein the cleavage temperature is less than 120° C.

8. A process as claimed in Claim 1, wherein the sorbic acid formed is separated from the reaction solution when the conversion rate of the polyester is below 95%.

9. A process as claimed in Claim 4, wherein a mixture of toluene and acetic acid is used as solvent.

10. A process as claimed in Claim 1, wherein the cleavage temperature is from 110° to 80° C.

11. A process as claimed in Claim 1, wherein the sorbic acid formed is separated from the reaction solution when the conversion rate of the polyester is from 30 to 90%.

12. A process as claimed in Claim 4, wherein, when a toluene/acetic acid mixture is used as solvent, the amount of acetic acid is from 10 to 40 weight percent.

13. A process as claimed in Claim 1, wherein the reaction is carried out with exclusion of atmospheric oxygen.

14. A process as claimed in Claim 1, wherein the reaction is carried out in an inert gas atmosphere.

15. A process as claimed in Claim 1, wherein the reaction is carried out under atmospheric pressure.

References Cited

UNITED STATES PATENTS 3,499,029   3/1970   Fernholz et al. ____ 260—526 N

VIVIAN GARNER, Primary Examiner